(12) United States Patent
Yousefzadeh et al.

(10) Patent No.: US 12,393,832 B2
(45) Date of Patent: Aug. 19, 2025

(54) NEUROMORPHIC PROCESSING SYSTEM AND METHOD OF OPERATING THE SAME

(71) Applicant: Snap Inc., Santa Monica, CA (US)

(72) Inventors: Amirreza Yousefzadeh, Eindhoven (NL); Orlando Miguel Pires Dos Reis Moreira, Eindhoven (NL); Peng Qiao, Eindhoven (NL)

(73) Assignee: Snap Inc., Santa Monica, CA (US)

( * ) Notice: Subject to any disclaimer, the term of this patent is extended or adjusted under 35 U.S.C. 154(b) by 884 days.

(21) Appl. No.: 17/598,128

(22) PCT Filed: Mar. 26, 2020

(86) PCT No.: PCT/EP2020/058502
§ 371 (c)(1),
(2) Date: Sep. 24, 2021

(87) PCT Pub. No.: WO2020/193690
PCT Pub. Date: Oct. 1, 2020

(65) Prior Publication Data
US 2022/0188615 A1    Jun. 16, 2022

(30) Foreign Application Priority Data
Mar. 27, 2019   (EP) .................................. 19165490

(51) Int. Cl.
*G06F 13/14*      (2006.01)
*G06F 15/173*     (2006.01)
*G06N 3/063*      (2023.01)

(52) U.S. Cl.
CPC ....... *G06N 3/063* (2013.01); *G06F 15/17306* (2013.01)

(58) Field of Classification Search
CPC ........................... G06N 3/063; G06F 15/17306
See application file for complete search history.

(56) References Cited

U.S. PATENT DOCUMENTS 9,836,691 B1 * 12/2017 Narayanaswami .. G06N 3/0464
11,456,984 B2 *  9/2022 Shingu .................... H04L 51/04
(Continued)

FOREIGN PATENT DOCUMENTS

EP    3340128 A1 * 6/2018 ............. G06N 3/049
EP    3343458 A1 * 7/2018 ............. G06N 3/049
(Continued)

OTHER PUBLICATIONS

"European Application Serial No. 19165490.4, Extended European Search Report mailed Sep. 25, 2019", 9 pgs.
"European Application Serial No. 20712612.9, Response to Communication pursuant to Rules 161(1) and 162 EPC filed May 4, 2022", 20 pgs.
(Continued)

*Primary Examiner* — Cheng Yuan Tseng
(74) *Attorney, Agent, or Firm* — Schwegman Lundberg & Woessner, P.A.

(57) ABSTRACT

A neuromorphic processing system (1) is disclosed comprising a plurality of neuromorphic processing clusters (100) coupled to a message exchange network (20) for exchange of event messages. A neuromorphic cluster therein comprises a message receiving facility (110) to receive event messages from the message exchange network, a message transmitting facility (120) to transmit event messages via the message exchange network and a neuromorphic processor (130) having a set of state memory entries (10 *j*) for storing a value representative of a neuromorphic state associated with a neuromorphic element and a computation facility (134) to update the neuromorphic state associated with neuromorphic elements that are indicated as the destination of the event message. The message receiving facility (110) and/or the message transmitting facility (120) are enhanced to enable message distribution according to a pattern.

20 Claims, 9 Drawing Sheets

(56) References Cited

U.S. PATENT DOCUMENTS

| | | | | |
|---|---|---|---|---|
| 2018/0174032 A1* | 6/2018 | Davies | | G06N 3/063 |
| 2018/0174033 A1* | 6/2018 | Davies | | G06N 3/063 |
| 2018/0357530 A1* | 12/2018 | Beery | | H04L 1/0045 |
| 2019/0042930 A1* | 2/2019 | Pugsley | | G06N 3/065 |
| 2019/0121734 A1* | 4/2019 | Akopyan | | G06F 12/063 |

FOREIGN PATENT DOCUMENTS

| | | | | | |
|---|---|---|---|---|---|
| EP | 3343461 | A1 | * | 7/2018 | |
| EP | 3343465 | A1 | * | 7/2018 | ........... G06N 3/0445 |
| EP | 3547227 | A1 | * | 10/2019 | ............. G06N 3/045 |
| EP | 3605401 | A1 | * | 2/2020 | ............. G06N 3/049 |
| EP | 3640862 | A1 | * | 4/2020 | |
| EP | 3716154 | A1 | | 9/2020 | |
| EP | 3948674 | A1 | | 2/2022 | |
| WO | WO-2020193690 | A1 | | 10/2020 | |

OTHER PUBLICATIONS

"International Application Serial No. PCT/EP2020/058502, International Preliminary Report on Patentability mailed Oct. 7, 2021", 9 pgs.

"International Application Serial No. PCT/EP2020/058502, Written Opinion mailed Jun. 23, 2020", 7 pgs.

European Patent Office, International Search Report in corresponding International Application No. PCT/EP2020/058502, dated Jun. 23, 2020 (3 pages).

"European Application Serial No. 20712612.9, Communication Pursuant to Article 94(3) EPC mailed Jun. 25, 2024", 6 pgs.

"European Application Serial No. 20712612.9, Response filed Oct. 11, 2024 to Communication Pursuant to Article 94(3) EPC mailed Jun. 25, 2024", 31 pgs.

"New international patent application in the name of GrAI Matter Labs S.A.S. claiming priority from EP 19165490.4 filed on Mar. 27, 2019," PCT Direct / informal comments filed Mar. 6, 2020, 11 pgs.

* cited by examiner

NEUROMORPHIC PROCESSING SYSTEM AND METHOD OF OPERATING THE SAME

CROSS-REFERENCE TO RELATED APPLICATIONS

This patent application is a U.S. National Phase of PCT International Application No. PCT/EP2020/058502, filed Mar. 26, 2020, which claims priority to European Application No. 19165490.4, filed Mar. 27, 2019, which are both expressly incorporated by reference in their entireties, including any references contained therein.

Neuromorphic processors are contemplated as an approach to address massive computation tasks. A neuromorphic processor comprises a plurality of neuromorphic elements that communicate by event-messages which has some similarity to a brain in which neurons are interconnected to each other by synapses, enabling them to transmit data as a spike when their membrane potential representing their state exceeds a threshold value. A spike transmitted by a neuron can result in an increase or a decrease of the membrane potential of the recipient neuron.

Convolution with a convolution kernel is a typical operation applied in signal processing, e.g. in image or audio processing. In a neuromorphic processor this can be applied in that a firing neuromorphic element transmits an event message to a set of recipient neuromorphic elements corresponding to the footprint of the convolution kernel. For example in case of convolution with a 5×5 kernel the firing neuromorphic element sends the event message to 25 recipients. In case the input image of 32×32 pixels is processed with 16 populations of neuromorphic elements (feature maps), the input layer, i.e. the first layer of the neural network has 16K neuromorphic elements and therewith requires 16K×25=400K connections to perform the convolution. A substantial amount of memory is required to define the large number of connections. Accordingly, there is a need to enable convolution operations in a neuromorphic processor with reduced memory requirements.

SUMMARY

In accordance with the above-mentioned need, an improved neuromorphic processing system is provided. The neuromorphic processing system comprises a plurality of neuromorphic processing clusters coupled to a message exchange network for exchange of event messages. A neuromorphic cluster comprises message receiving facility, message transmitting facility and a neuromorphic processor.

The message receiving facility is to receive event messages from the message exchange network and the message transmitting facility is to transmit event messages via the message exchange network.

The neuromorphic processor has a set of state memory entries for storing a value representative of a neuromorphic state associated with a neuromorphic element and a computation facility to update the neuromorphic state associated with neuromorphic elements that are indicated as the destination of the event message. A neuromorphic element with which a neuromorphic state is associated may be provided with a proper computation unit to update its state. In that case the memory entry for storing the value representative of its neuromorphic state is preferably provided as a register within the computation unit. Typically however, a plurality of neuromorphic elements, e.g. all neuromorphic elements in a cluster share a computation facility and the memory entries are addressable locations in a shared neural state memory.

Either the message receiving facility or the message transmitting facility or both the message receiving facility and the message transmitting facility are enhanced to facilitate a transmission of event messages to a set of messages according to a common pattern. Using a common pattern strongly reduces the requirements for storage of connectivity data.

The enhanced message receiving facility may include a pattern header memory and may further include a pattern memory. The enhanced message transmitting facility may be enhanced in that it comprises a synapse header memory and a synapse property memory.

An enhanced message receiving facility may provide a received message to a set of recipient neuromorphic processing elements in accordance with a pattern specified in the pattern header memory by retrieving from the event message a reference to the pattern header memory to use that reference to retrieve from the pattern header memory an indication for a set of neuromorphic elements being a destination of the message, and to compute a respective address of the neuromorphic elements in the set from that indication and the neuromorphic element destination component. The pattern to be applied may be directly defined by that indication, or may be indirectly defined by that indication in that the indication refers to a set of entries in a pattern memory.

Event messages exchanged via the message exchange network comprise a destination indication, an event message payload. The destination indication may include a cluster destination indication for a destination cluster and a neuromorphic element destination indication for a destination within the destination cluster. The event message may further include an event message type indicates whether the event message is a direct event message or is a packed event message An enhanced message receiving facility of a cluster may comprise an event message decoder to selectively apply the received message according to a pattern indicated in pattern header memory if it recognizes the messages as a packed event message The event message decoder upon determining from the event message type that the event message is a direct event message, may retrieve message parameters from the payload of the message and provide these message parameters to a specific neuromorphic element indicated by the second destination indication.

The improved neural processing system renders possible a substantial reduction in memory requirements for specifying the topology of the neural network formed with the neuromorphic elements. For example in the improved neural processing system the referenced entry in the pattern header memory of a cluster may directly or indirectly specify an address range relative to the destination indication in the event-message. Therewith the computation facility is capable to identify the recipient neuromorphic elements in its cluster from the combination of the destination indication in the message and the address range as specified directly or indirectly in the pattern header memory. Therewith the destination indication in the event message can be used to controllably apply the same pattern to different sets of target neuromorphic elements. Only a single memory entry is required to specify all connections. The referenced entry in the pattern header memory may comprise additional information, such as parameters for the operation required to update the recipient neuromorphic elements. For example the event message may be a leakage message. The leakage message is to cause a change of state of the recipient elements in a manner comparable to that of a physical neuron, which experiences a gradual decrease of its membrane potential in the absence of external input. The referenced entry in the pattern header memory may comprise leakage parameters to control the change of state.

In an embodiment the message receiving facility further includes a pattern memory. The referenced entry in the pattern header memory may include an indication of one or more entries in the pattern memory. In operation, the computation facility may update the neuromorphic elements in the specified set in accordance with a convolution pattern specified at the indicated one or more entries in the pattern memory. An entry in the pattern memory may comprise a weight indication, wherein the weight indication specifies a weight of the indicated element in the pattern to be applied when updating the neuromorphic element coinciding with element in the pattern. Therewith it is made possible to perform convolution operations with a modest load of the message exchange network and modest memory requirements for specifying the topology. The transmitting neuromorphic element only needs to transmit a single packed message, and the computation facility of the receiving cluster applies the convolution pattern to the specified set of recipient neuromorphic elements. A neighboring transmitting neuromorphic element can apply the same convolution pattern to a further (displaced, but typically overlapping) set of recipient neuromorphic elements.

BRIEF DESCRIPTION OF THE DRAWINGS

These and other aspects are described in more detail with reference to the drawings. Therein.

DETAILED DESCRIPTION OF EMBODIMENTS

Figure 1:
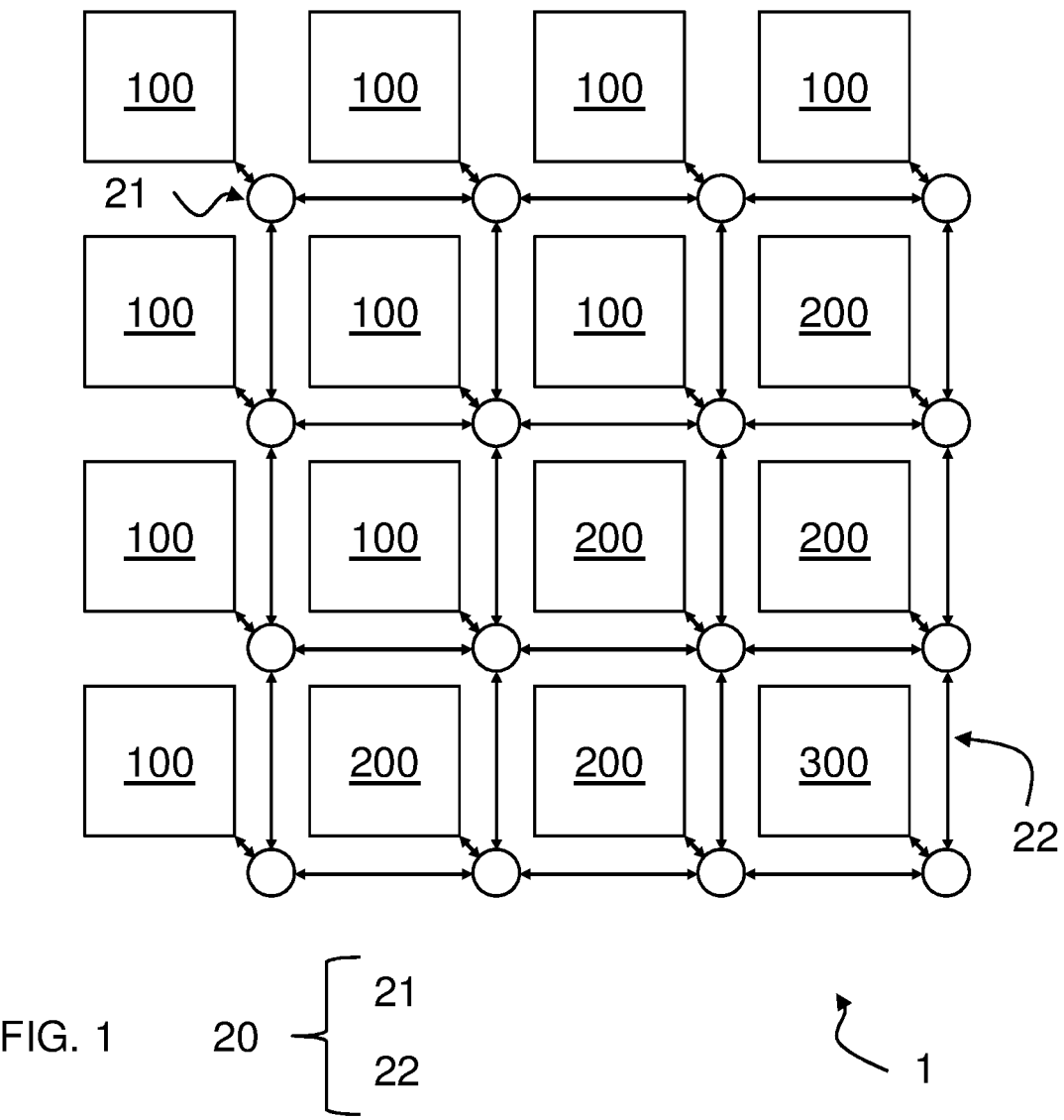
FIG. 1 schematically shows a neuromorphic processing system comprising a plurality of neuromorphic processing clusters coupled to a message exchange network for exchange of event messages.

FIG. 1 schematically shows a neuromorphic processing system 1 comprising a plurality of neuromorphic processing clusters 100 coupled to a message exchange network 20 for exchange of event messages. As schematically shown, the network 20 comprises network nodes 21 forming an interface with respective clusters 100 and network links 22. Processing units of a different type, such as digital signal processors 200 and a host processor may also be coupled to the network.

Figure 2:
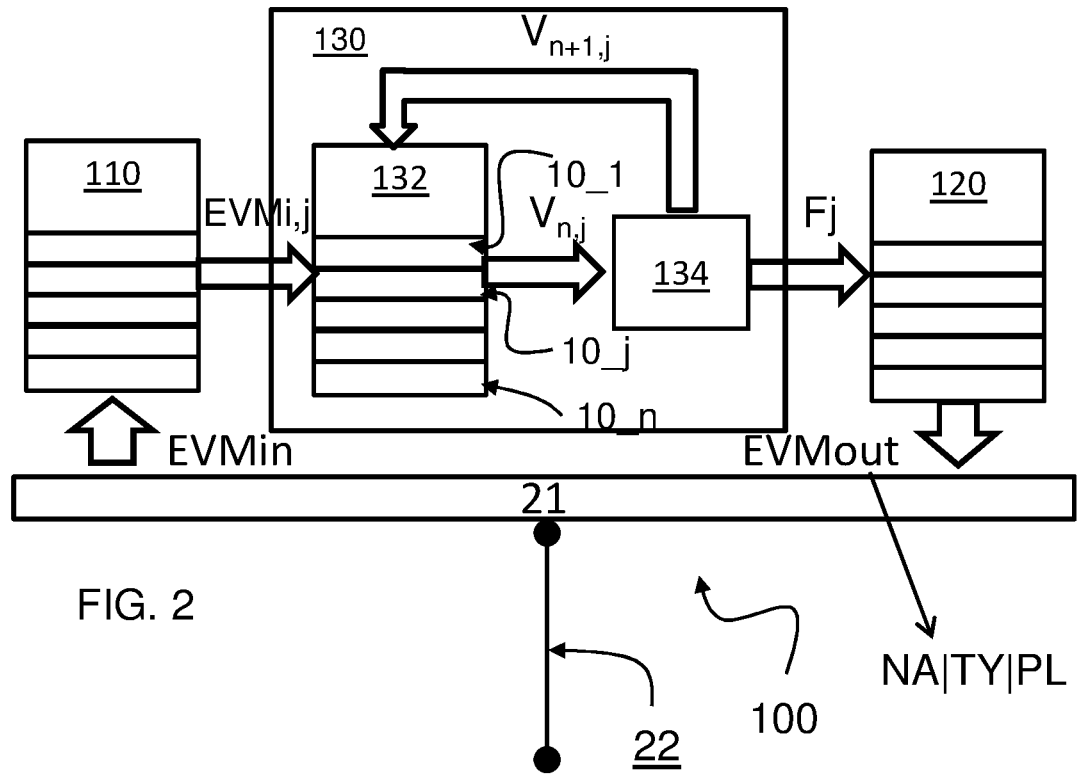
FIG. 2 shows neuromorphic processing cluster in more detail.

FIG. 2 shows a neuromorphic processing cluster 100 in more detail. As shown therein the processing cluster 100 includes a message receiving facility 110, coupled to network node 21, to receive event messages EVMin from the message exchange network 20. The processing cluster 100 further includes a message transmitting facility 120, coupled to the network node 21, to transmit event messages via the message exchange network 20.

The neuromorphic processing cluster 100 further includes a neuromorphic processor 130 having a set of state memory entries 10_j in a neuromorphic state memory 132 for storing a value representative of a neuromorphic state associated with a neuromorphic element and a computation facility 134 to update the neuromorphic state associated with neuromorphic elements that are indicated as the destination of an event message. In FIG. 2 this is schematically illustrated in that the computation facility 134 fetches a value $V_{n,j}$ indicative for a current neuromorphic state associated with a neuromorphic element j from memory location 10_j and writes back to that location the value $V_{n+1,j}$ indicative for the updated neuromorphic state. As further specified below, if it is the case that the value for the neuromorphic state tends to exceed a threshold potential, the neuromorphic element j may issue a control signal Fj to the message transmitting facility 120 that causes the latter to transmit one or more event messages EVMout.

The event message EVMout to be transmitted by the message exchange network 20 comprises a destination indication NA, an event message type TY and an event message payload PL. The destination indication NA includes a first destination indication DST-C-ID for a destination cluster and a second destination indication DST-N-ID for a destination within the destination cluster. The event message type TY indicates whether the event message is a direct event message or is a packed event message. The first destination indication DST-C-ID enables a delivery of the event message to the proper cluster.

Figure 3:
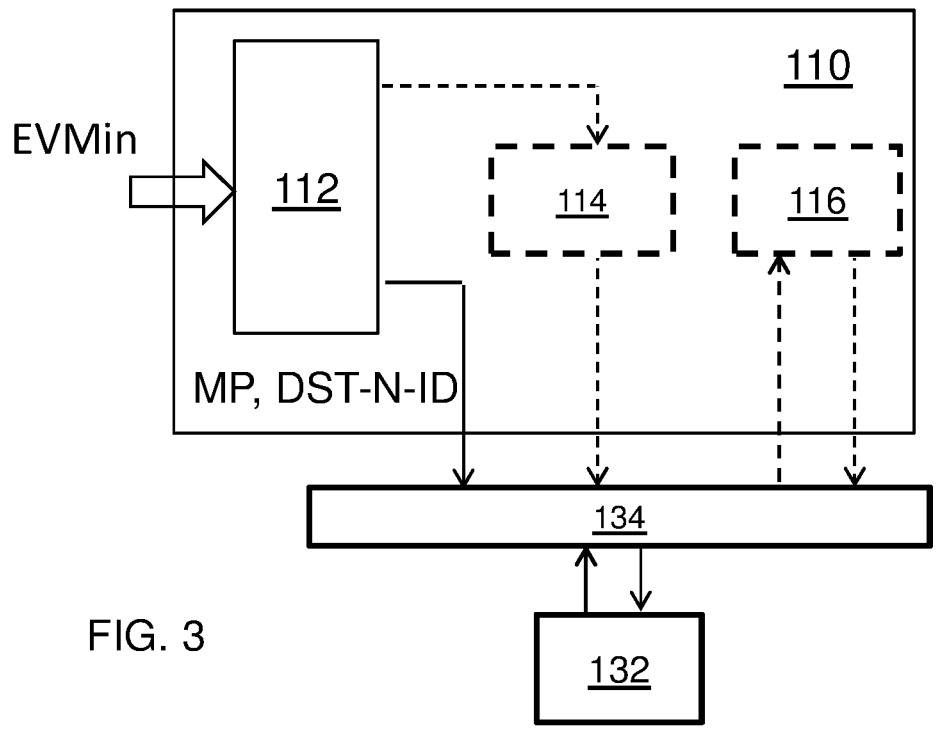
FIG. 3, schematically shows an embodiment of a message receiving facility in a first operational mode.

FIG. 3 schematically shows how a message EVMin is received by the message receiving facility 110 of a neuromorphic processing cluster addressed by a first destination indication DST-C-ID in the message. Once received the first destination indication DST-C-ID is no longer relevant. As shown in FIG. 3, the message receiving facility 110 comprises an event message decoder 112 responsive to the event message type TY. The message receiving facility 110 further comprises a pattern header memory 114, and may further comprise a pattern memory 116.

The message decoder 112 is to determine which type TY is indicated in the message EVMin. FIG. 3 schematically shows the case wherein it determines that the event message is a direct event message. In that case it retrieves message parameters MP from the payload PL of the message and instructs the computation facility to update the specific neuromorphic element indicated by the second destination indication DST-N-ID with these message parameters. In the embodiment shown, wherein the neuromorphic elements are represented by their neuromorphic state in a proper entry of the neuromorphic state memory 132, the message decoder 112 instructs the shared computation facility to update the neuromorphic state in that entry in accordance with the message parameters. In an embodiment a predetermined function may be used for updating. For example an accumulation function may be used wherein a weight included in the message parameters is added to the value indicating the neuromorphic state of the indicated specific neuromorphic elements. The message parameters may also include a polarity to enable a selection between additive and subtractive operations. In other embodiments the message parameters may include an instruction code for enabling an update according to other functions.

The state of a neuromorphic element j at a point in time n, may be represented as a state value $V_{n,j}$. The event message may for example be an accumulation message. In response thereto the computation facility 134 may compute its new state value $V_{n+1,j}$ as:

$V_{n+1,j} \leftarrow V_{n,j}+/-W$, dependent on a sign SGN indicative for a polarity contained in the accumulation message.

A firing event signal Fj as control signal for the message transmitting facility 120 may be issued by the neuromorphic element j if the state value exceeds a threshold value. In that case the state of the neuromorphic element j is typically reset to a reset value RESET_VALUE (e.g. 0).

As an other example the operation specified by the message is a leakage operation. Therewith the new state value is computed as:

$$V_{n+1,j} \leftarrow V_{n,j}-((V_{n,j}-\text{Bias})>>\tau)$$

Therein the symbol ">>" represents a binary shift right operation with $\tau$ binary digits, which can alternatively be written as a division by $2^\tau$. The binary shift right operation can be efficiently performed. The parameter $\tau$ makes it possible to control the effect of the leakage. A relatively high value for the parameter $\tau$ corresponds to a small leak rate and thus a reduction with a relatively small leakage value. A relatively low value for the parameter $\tau$ corresponds to a high leak rate and thus a reduction with a relatively large leakage value. A value of 0 for the parameter $\tau$ results in a complete reset of the neuromorphic element receiving the leakage message. Whether or not this is the case, may depend on whether the leakage value depends on further parameter(s). For example, the leakage value may be computed from the difference of the state value and a value of a parameter "Bias". In case that the message decoder 112 determines that the event message is a packed event message it retrieves from the payload PL of the event message EVM a reference, P-ID, to the pattern header memory 114. It then uses that reference to retrieve from the pattern header memory an indication for a set of neuromorphic elements being a destination of the message. The set may for example be indicated in the referenced entry of the pattern header memory 114 by its size, wherein the second destination indication DST-N-ID specifies the first neuromorphic element of the set.

The message decoder 112 uses the information in the referenced entry in the pattern header memory 114 to instruct the computation facility 134 to update the neuromorphic elements of the indicated set of neuromorphic elements. Various options are possible. According to a first option, it may instruct the computation facility 134 to update the neuromorphic elements of the indicated set of neuromorphic elements with one or more common update parameter values, such as a size SZ of the set, a bias value LKB and a leakage rate value LKR. In this case, the message decoder may further retrieve the one or more common update parameter values from the referenced entry in the pattern header memory 114 and instruct the computation facility 134 to update the neuromorphic elements of the set of neuromorphic elements in accordance with said one or more common update parameter values. As an example shown in FIG. 4, the update operation for the indicated set of neuromorphic elements may be a leakage operation to be performed according to a common bias value LKB and a common leakage rate value LKR specified in the pattern header memory 114. Hence, in that case for all of neuromorphic elements j in the set the following computation is performed.

$$V_{n+1,j} \leftarrow V_{n,j}-((V_{n,j}-LKB)>>LKR)$$

Figure 5:
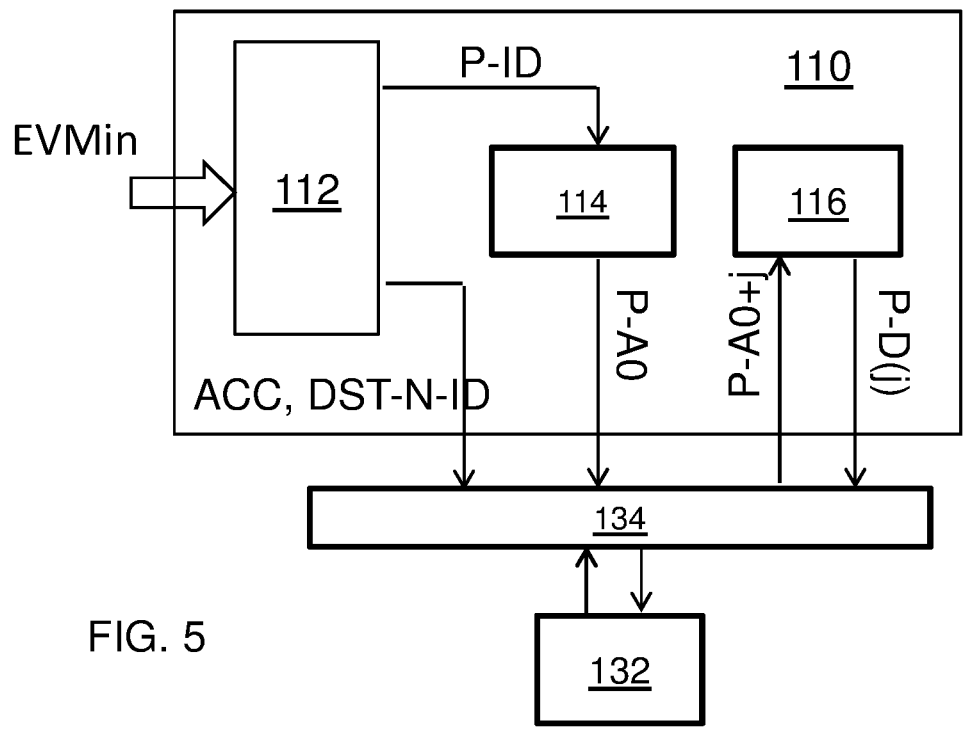
FIG. 5, schematically shows an embodiment of a message receiving facility in a third operational mode.

According to another option, illustrated in FIG. 5, the referenced entry in the pattern header memory 114 may comprise a reference to one or more entries in a pattern memory 116, and the message decoder 112 may instruct the computation facility 134 to update the neuromorphic elements of the set of neuromorphic elements in accordance with parameter values specified in the referenced one or more entries in a pattern memory 116.

In an embodiment the neuromorphic elements represent a multidimensional state space, having at least a first and a second mutually independent direction. A first cluster of neuromorphic elements may for example represent a source image, wherein each neuromorphic element represents a pixel in a multidimensional (e.g. two or three dimensional) image space and its neuromorphic state represents a pixel value, e.g. an intensity. The pattern specified in the pattern memory may be a convolution pattern that is applied (e.g. as a Laplace or a gradient operation) to render a processed image in a second cluster of neuromorphic elements representing a multidimensional state space. The convolution pattern specifies a mapping from respective source neuromorphic elements to a respective set of target neuromorphic elements. The respective set of target neuromorphic elements may be in the same cluster or in a cluster different from that of the source neuromorphic elements. It is not necessary that the state spaces represented by the first and by the second cluster of neuromorphic elements have the same number of dimensions. E.g. the convolution pattern may involve a projection of a three dimensional image to a two dimensional image.

In the example illustrated in FIG. 5, the operation as specified is an accumulation ACC and the entry in pattern header memory 114 referenced with P-ID comprises a base address P-A(0) of a convolution pattern in the pattern memory 116. The message decoder 112 instructs the computation facility 134 to update the neuromorphic elements of the indicated set of neuromorphic elements in accordance with that convolution pattern. According to a first option the pattern header memory 114 specifies a size of the set of neuromorphic elements and this size determines the range of the convolution pattern in the pattern memory 116. With this information the computation facility 134 can access the entries in pattern memory 116 with entries P-A0, PA0+1, PA0+j, P-A0+Size-1 and retrieve the corresponding pattern data P-D(j), for example a weight (value) for the accumulation operation of neuromorphic element with ID DST-N-ID+j, so that the computation facility can perform the accumulation operation with a respective weight to each neuromorphic element in the set.

Alternatively, according to a second option, the pattern data in pattern memory 116 may comprise a continue/stop indication. In that case the computation facility 134 proceeds until it fetches from the pattern memory 116 the last element of the pattern, as indicated by the continue stop indication. The pattern header memory 114 does not have to specify the size in that case.

Alternatively or in addition the pattern data in pattern memory 116 may comprise an offset indication. This specifies the identity of the next neuromorphic element of the set relative to the one which is currently updated. The collection of offset indications in the entries of a convolution pattern in pattern memory 116 together define a shape of the convolution pattern. In an embodiment the offset indicator comprises an indication selected from a set of at least three indicator values for computing a neuromorphic element index in mutually different directions in the state space. For example a two-bits Offset indication may be used which defines an offset-X in an X-direction, and an offset-Y in a Y-direction orthogonal to the X-direction.

Offset=00 (NM): No offset: Indicates this is the last pattern element
Offset=01 (MR): Continue with Offset-X=1; Offset-Y=0
Offset=10 (ML): Continue with Offset-X=−1; Offset-Y=0
Offset=11 (MD): Continue with Offset-X=0; Offset-Y=1

Figure 6A:
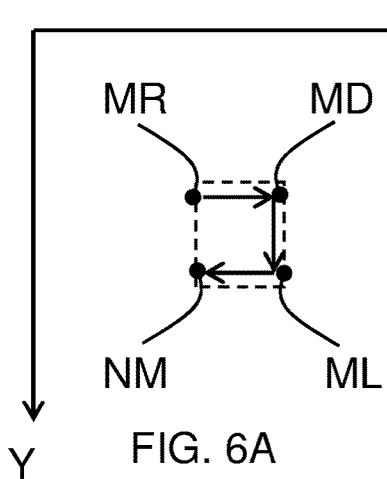
FIG. 6A-6G show various exemplary patterns.
Figure 6B:
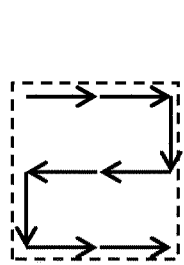
Figure 6C:
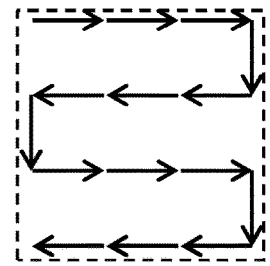
Figure 6D:
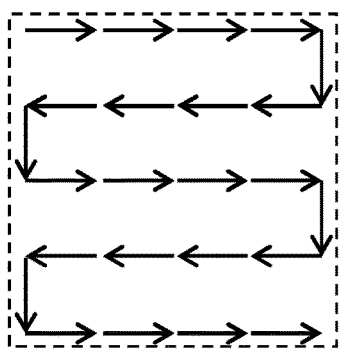
Figure 6E:
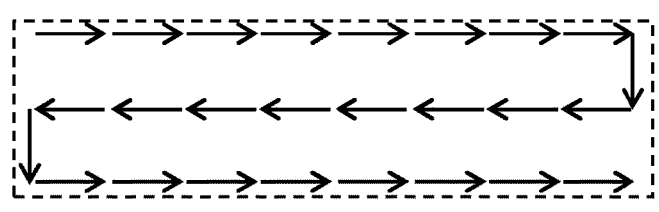
Figure 6F:
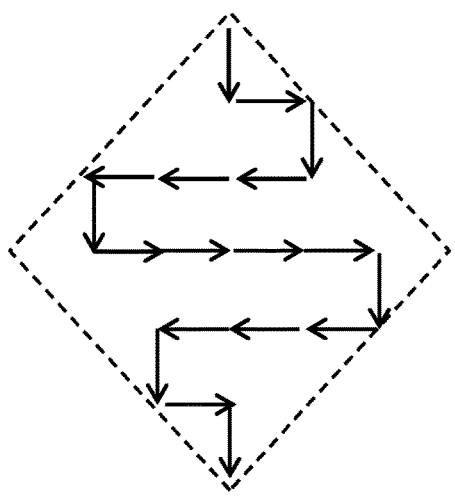
Figure 6G:
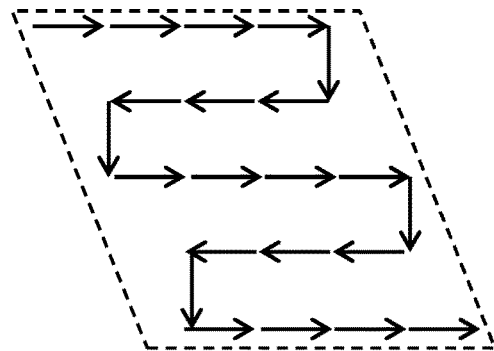

FIG. 6A shows an example wherein this indication is applied to a convolution pattern with four pattern elements. The pattern memory 116 may for example comprise the following four entries:
Offset=MR|Weight=1
Offset=MD|Weight=−1
Offset=ML|Weight=1
Offset=NM|Weight=−1

In operation the computation facility 134 receives the instruction indicating that an accumulation ACC is to be applied to the set of neuromorphic elements having a neuromorphic element with ID=DST-N-ID as the first one. The computation facility 134 fetches the first element of the pattern from pattern memory 116 from the location P-A0 specified by the pattern header memory 114, and determines that the specified operation, in this case an accumulation operation ACC, is to be applied with Weight=1 to that first neuromorphic element. The first element of the pattern also specifies that the offset to be applied is Offset-X=1; Offset-Y=0. Therewith the computation facility 134 computes the ID of the neuromorphic element to which the next pattern element is to be applied as:
ID←ID+1=DST-N-ID+1.

The computation facility 134 then fetches the second element of the pattern from pattern memory 116 from the location P-A0+1, and determines that the weight specified therein is equal to −1. In accordance therewith it performs an accumulation operation ACC with Weight=−1 to the neuromorphic element with ID=DST-N-ID+1.

The second element of the pattern also specifies that the offset to be applied is Offset-X=0; Offset-Y=1. An Offset of N units in the Y direction corresponds to an Offset of N*Stride units in the X-direction, wherein Stride is the number of neuromorphic elements in one row with the same Y-coordinate. Therewith the computation facility 134 computes the ID of the neuromorphic element to which the next, third, pattern element is to be applied as:
ID←ID+Stride=DST-N-ID+Stride+1.
It then performs an accumulation operation ACC with Weight=1, as specified in the third pattern element with address P-A0+2, to the neuromorphic element with ID=DST-N-ID+Stride+1.
Using the Offset specification in the third pattern element, the computation facility 134 computes the ID of the subsequent neuromorphic element as: ID←ID−1=DST-N-ID+Stride and it applies thereto an accumulation operation ACC with Weight=−1, as specified in the fourth pattern element with address P-A0+3. The computation facility 134 determines that the Offset indicator in the fourth pattern element has the value NM and accordingly has completed the operations for the pattern starting at location P-A0.

As illustrated in FIG. 6B-6G, the offset indicator provided as part of the pattern memory entry enables a flexible definition of the size and the shape of the convolution pattern to be applied.

As indicated above, various options are possible to process a received event-message EVMin by the message receiving facility 110. E.g. The message receiving facility 110 may process a received event-message EVMin by instructing the computation facility 134 to perform an operation with the same parameter values to all neuromorphic elements of the set of neuromorphic elements that are the target of the message, as described with reference to FIG. 4. In that case, a pattern memory 116 is not necessary. Alternatively, the message receiving facility 110 may process a received event-message EVMin by instructing the computation facility 134 to perform an operation with respective parameter values for each neuromorphic element, as described with reference to FIG. 5.

In an embodiment a packed event message comprises a subtype indication indicating whether the packed event message is of a first subtype specifying that the neuromorphic elements of the set of neuromorphic elements are to be updated with one or more common update parameter values, or whether the packed event message is of a second subtype specifying that the neuromorphic elements of the set of neuromorphic elements are to be updated according to an update parameter pattern. In that embodiment, the message decoder 112 upon determining that the packed event message is of the first subtype proceeds in the manner as described with reference to FIG. 4. I.e. it further retrieves said one or more common update parameter values from the referenced entry in the pattern header memory 114 and instructs the computation facility to update the neuromorphic elements of the set of neuromorphic elements in accordance with said one or more common update parameter values. When the message decoder 112 determines that the packed event message is of the second subtype, it proceeds in the manner as described with reference to FIG. 5. I.e. it further retrieves a reference to one or more entries in the pattern memory 116 from the referenced entry of the pattern header memory 114 and instructs the computation facility to update the neuromorphic elements of the set of neuromorphic elements in accordance with parameter values specified in the referenced one or more entries in the pattern memory 116.

Figure 7:
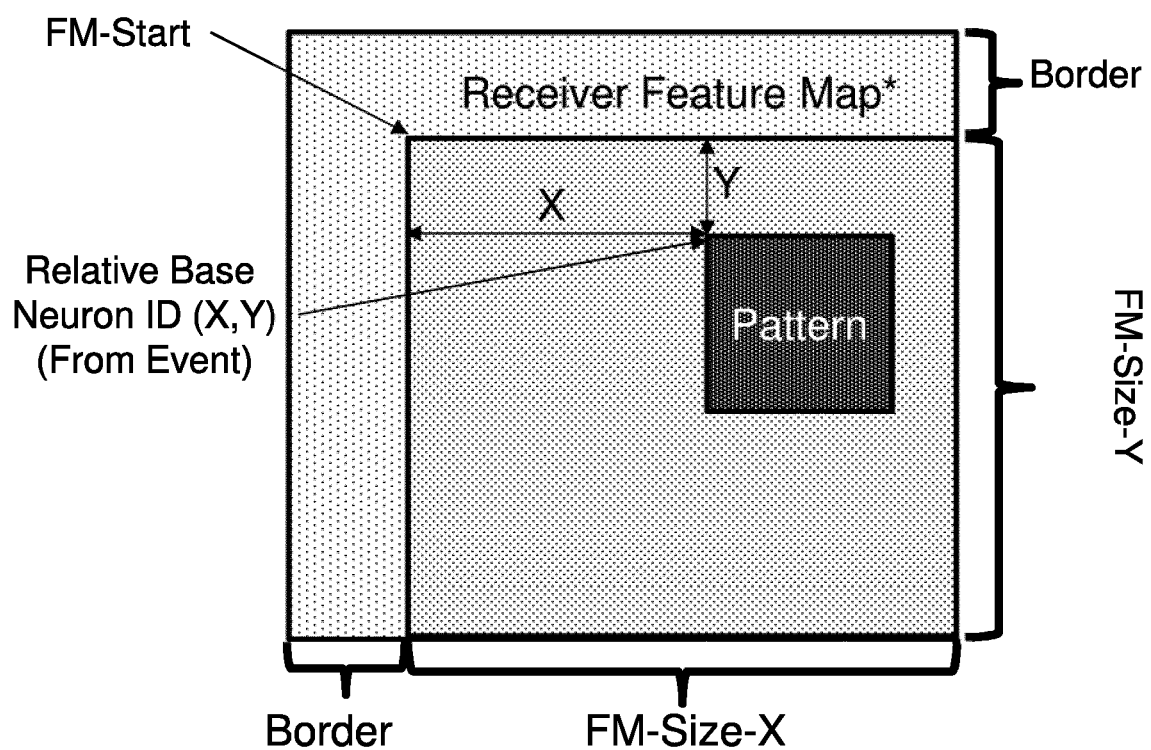
FIG. 7 illustrates a definition of a feature map in a neuromorphic processing cluster.

As shown in FIG. 7, the pattern header memory 114 may further specify receiver feature map FM within the destination cluster. In the embodiment shown, this is the case in that the entry in the pattern header memory specifies a start address FM-Start, (or FM-Start-X, FM-Start-Y) i.e. the neuron ID of the first neuromorphic element forming part of the feature map and the size of the feature map. In this case the feature map FM is two-dimensional and its size is determined by an X-dimension FM-Size-X and a Y-dimension FM-Size-Y. In the embodiment shown, the neuron ID (or neuron ID-X, neuron ID-Y) included in the event message is considered as an identification of a neuromorphic processing element relative to the neuron ID of the first neuromorphic element indicated by FM-Start. Accordingly the Xabs, Yabs address of the destination neuromorphic element is computed as:
Xabs=FM-Start-X+neuron ID-X
Yabs=FM-Start-Y+neuron ID-Y
Or equivalent thereto.
IDabs=FM-Start+neuron-ID
In an embodiment, an event message may further include a sign N-ID-Sign having a value selected from {0,1} from this information and the value neuron—ID a relative base neuron ID (RBN-ID) can be computed from the destination neuron address as follows:
In case N-ID-Sign=0 the components RBN-ID-X and RBN-ID-Y are taken
RBN-ID-X=dst-neuron-addr(7:6, 2:0)
RBN-ID-Y=dst-neuron-addr(9:8, 5:3)
Therein the bits selected from the destination neuron address are indicated between brackets.
In case N-ID-Sign=1 then further the value of the bits 9:8 of the destination neuron address is determined.
If dst-neuron-addr[9:8]==00 then:
RBN-ID-X=dst-neuron-addr(2: 0)–8
RBN-ID-Y=dst-neuron-addr(7:3)
If dst-neuron-addr[9:8]==01 then:
RBN-ID-X=dst-neuron-addr(7:6, 2: 0)
RBN-ID-Y=dst-neuron-addr(5:3)–8
If dst-neuron-addr[9:8]==10 then:
RBN-ID-X (7b)=dst-neuron-addr(2: 0)–8
RBN-ID-Y (7b)=dst-neuron-addr(5:3)–8
Subsequently, one or more events can be generated from the pattern using the process specified below in pseudo-code:

```
X = RBN-ID-X, Y = RBN-ID-Y, i=0
While (1){
   | Offset | Weight | = Pattern(Pattern-MEM-Start + i)
   If 0<X<FM-Size-X and 0<Y<FM-Size-Y and Weight≠0
      Output: {| N-ID = [X+ (Y<<FM-L-Size-X) + FM-Start] | Syn-Type=
[Acc]
| Value= Weight × Polarity |}
   If Offset==[MR] X = X + 1
   If Offset==[ML] X = X – 1
   If Offset==[MD] Y = Y + 1
   If Offset==[NM] Break
   i = i + 1;
}
```

The expression (Y<<FM-L-Size-X) indicates that the Y value is binary shifted left with FM-L-Size-X positions. Therein FM-L-Size-X is the two-log of the size (FM-Size-X) of the pattern in the X-direction. Therewith the expression implicates a multiplication of Y with FM-L-Size-X.

Figure 8:
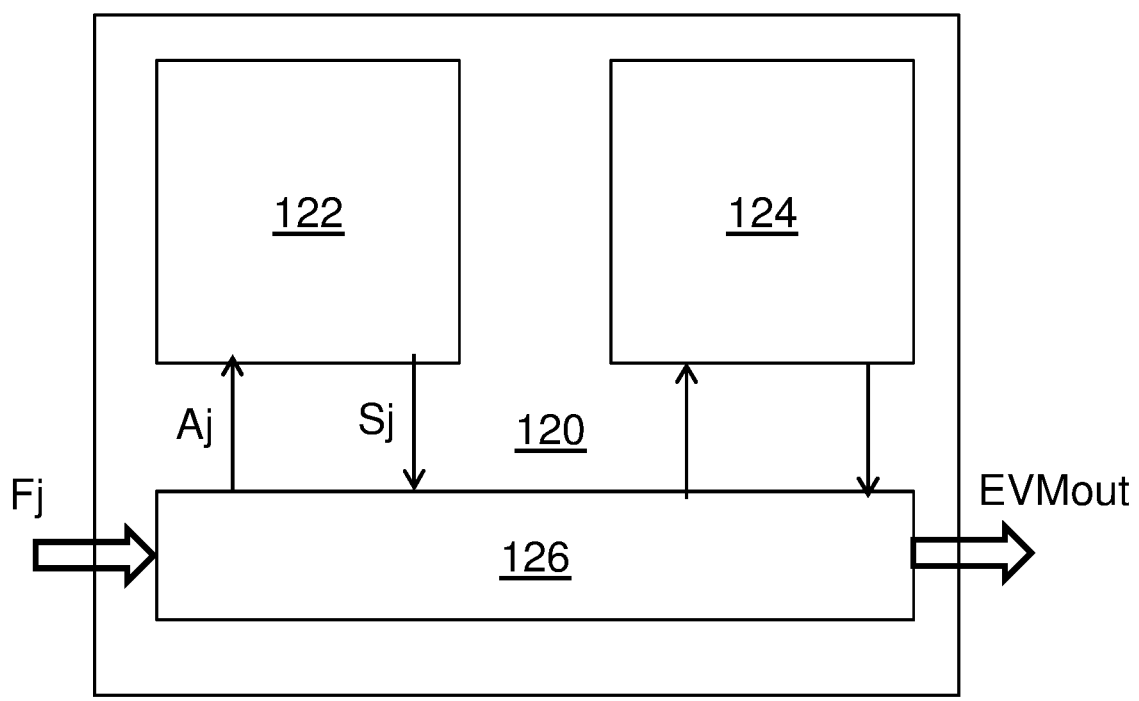
FIG. 8 shows an embodiment of a message transmission facility.

FIG. 8 schematically shows an embodiment of a message transmitting facility 120. The message transmitting facility 120 shown therein comprises a synapse header memory 122 a synapse property memory 124 and a controller 126. Respective entries in the synapse property memory 124 specify information for respective destination neuromorphic elements and respective entries in the synapse header memory 122 specify for respective transmitting neuromorphic elements respective sets of one or more entries in said synapse property memory. Upon receiving a signal Fj that a neuromorphic element j has "fired", the controller 126 accesses the synapse header memory 122 to determine sets Sj of one or more entries associated therewith in said synapse property memory 124. Using this information, it accesses the synapse property memory 124 to retrieve the specification needed to prepare respective output event messages EVMout. The specification for each output event message may include a destination cluster ID, e.g. indicating the ID of the destination cluster relative to the cluster proper to message transmitting facility, or providing an absolute cluster indication. The specification may further include a destination neuron ID, specifying the ID of the neuromorphic element in the destination cluster. The specification for each output event message may include a message type to indicate whether the message is to be processed as a direct message or as a packed message. In case of a direct message, the destination neuron ID directly refers to the neuromorphic element to be updated. In case of a packed message, the destination neuron ID enables the message receiving facility 110 of the destination cluster to determine which neuromorphic processing elements are comprised in the set to which the message applies. The destination neuron ID may for example indicate the first neuromorphic processing elements in the set.

In an embodiment, an entry at address Aj in synapse header memory may include a first cluster address component $C_{ID1,j}$ and a first neuromorphic element address component $N_{ID1,j}$ and the one or more entries k in the Sj of associated entries in the synapse property memory 124 each comprise a second cluster address component $C_{ID2,k}$ and second neuromorphic element address component $N_{ID2,k}$. Therewith the message transmitting facility 120 can compute the destination address $C_{IDjk}$, $N_{IDjk}$ for each of the messages to be transmitted as:

$$C_{IDjk} = C_{ID1,j} + C_{ID2,k}$$

$$N_{IDjk} = N_{ID1,j} + N_{ID2,k}$$

By computing the destination address $C_{IDjk}$, $N_{IDjk}$ as the sum of a first and a second component a single set of entries in the synapse property memory 124 can be used to specify a convolution kernel. The first cluster address component $C_{ID1,j}$ and the first neuromorphic element address component $N_{ID1,j}$ specify a respective offset with which the convolution kernel is to be shifted for each neuromorphic processing element that initiates a transfer of a set messages in accordance with the convolution kernel in the synapse property memory 124. It is noted that in some embodiments a synapse header memory may be absent. It may be contemplated for example to specify the information for a plurality of message destinations of a source neuromorphic processing element in a single entry of the synapse property memory.

Figure 9:
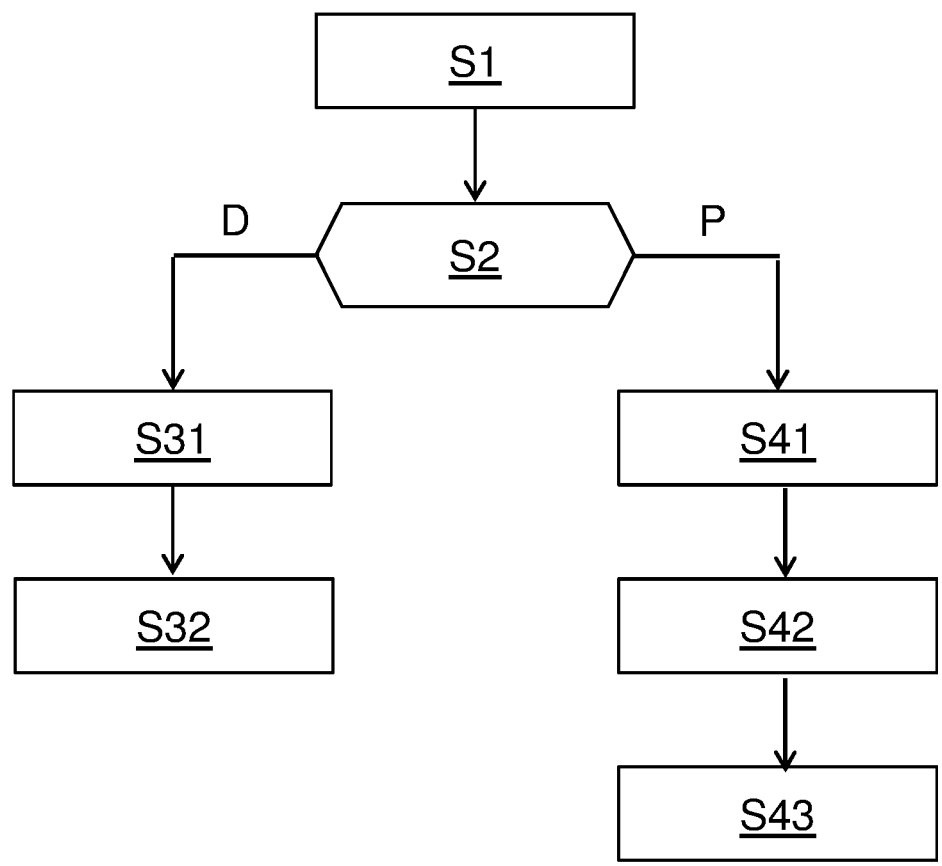
FIG. 9 shows an embodiment of a method of operating a neuromorphic processing system.

FIG. 9 schematically shows a method of operating a neuromorphic processing system 1 with a plurality of neuromorphic processing clusters 100 as shown for example in FIG. 1.

The method comprises receiving S1 by a neuromorphic processing cluster 100 an event message EVMin. The event message includes a destination indication NA that indicates one or more neuromorphic elements as the destination of the event message an event message type TY selected from a set including at least a "Direct" event message type and a "Packed" event message type, and an event message payload PL.

Figure 4:
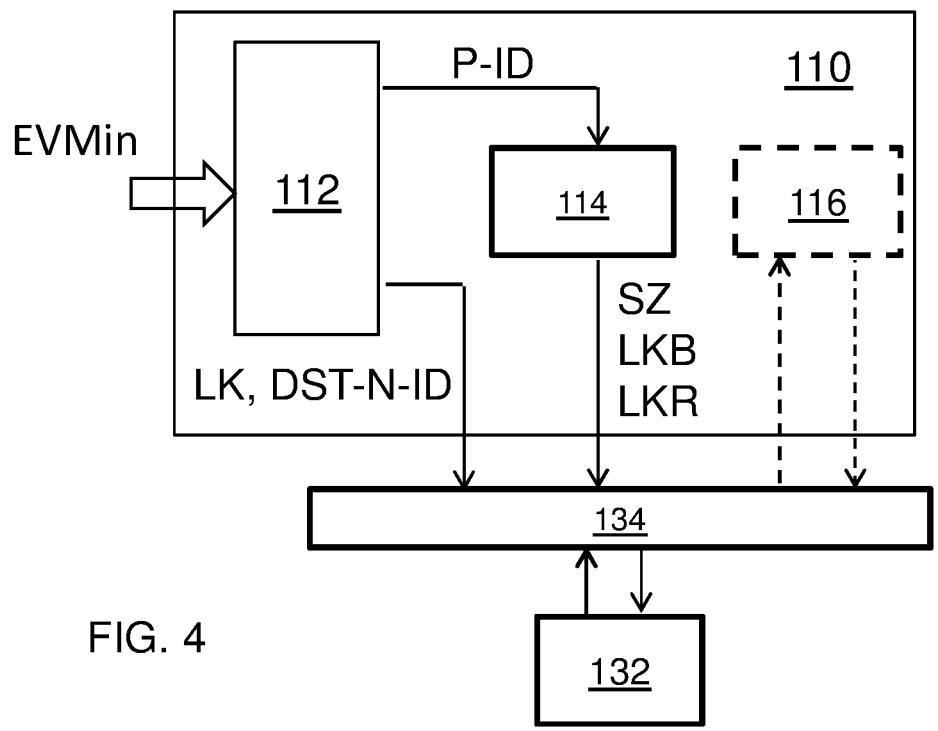
FIG. 4, schematically shows an embodiment of a message receiving facility in a second operational mode.

The method further comprises determining S2 the event message type TY of the event message, for example using the message decoder 112 in FIG. 3,4 or 5.

If it is determined that the event message is of type "Direct" (D), a single neuromorphic element is selected S31, which is specified as the destination of the message and a state of that neuromorphic element is updated S32 in accordance with message parameters contained in the message payload PL, e.g. by the computation facility 134.

If it is determined that the event message is of type "Packed" (P), an indication of an entry in a pattern header memory is retrieved (S41) from the event message payload PL, a specification for a set of neuromorphic elements as the destination is obtained S42 from the indicated entry. The specification may be provided directly or indirectly as a reference to a pattern memory comprising an indication of the destination. The neuromorphic elements in the specified set are subsequently updated S43.

Figure 10:
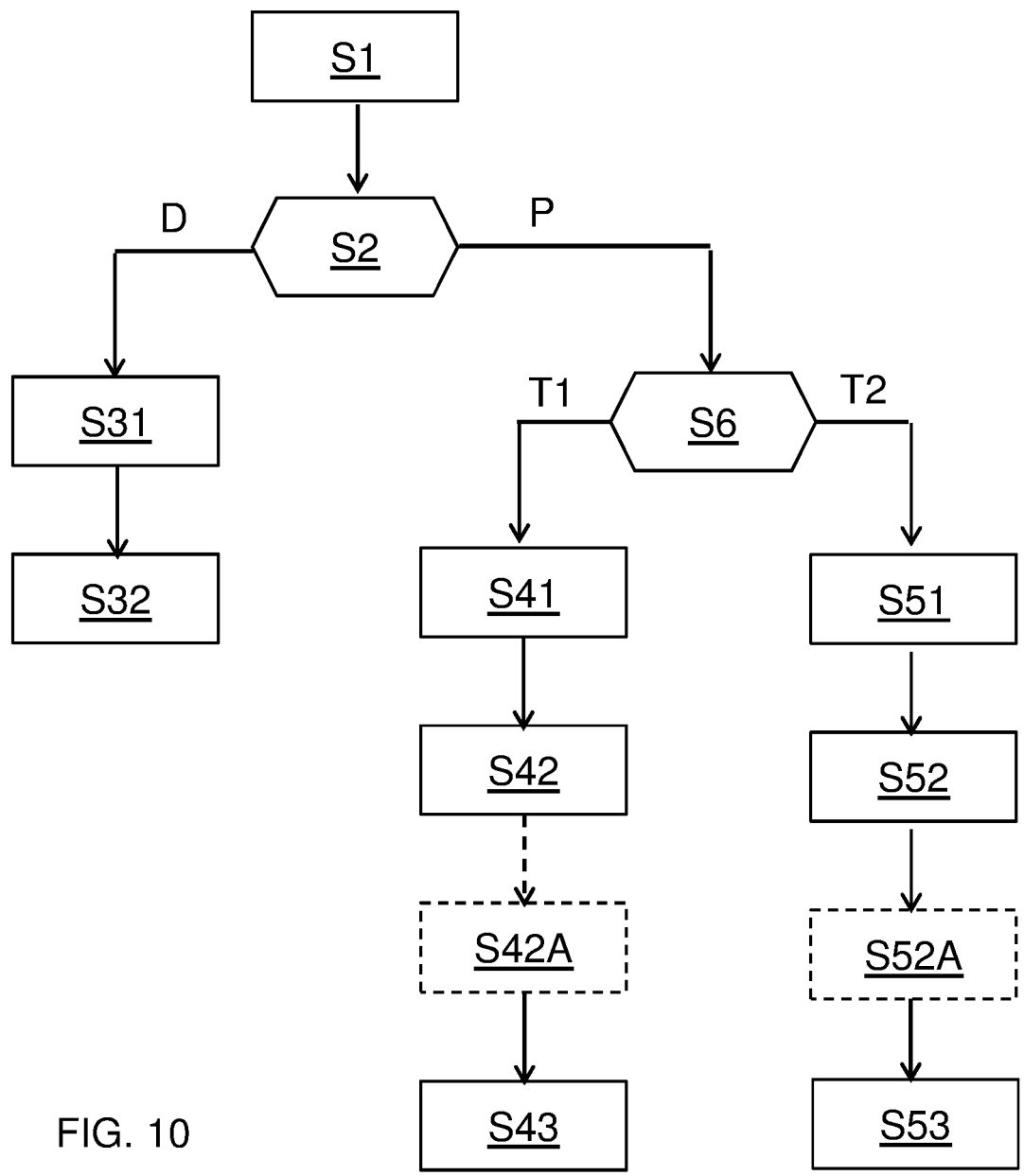
FIG. 10 shows an alternative embodiment of a method of operating a neuromorphic processing system.

FIG. 10 schematically shows an alternative method of operating a neuromorphic processing system 1 with a plurality of neuromorphic processing clusters 100 as shown for example in FIG. 1. In the method shown therein, steps S1, S2, S31 and S32 as well as steps S41, S42, S43 correspond to those in FIG. 9. However, upon determining P that the event message is a packed message, it is determined whether the event message is of a first or a second subtype. In case it is determined that the message is of the first subtype T1, steps S41, S42, S43 are performed. These steps correspond to the steps with the same reference numeral in FIG. 9.

Optionally, upon determining S6 that the message is of a first subtype T1, in addition update parameters are obtained S42A from the indicated entry of the pattern header memory and all neuromorphic elements in the specified set are updated S43 in accordance with said update parameters. Alternatively update parameters may be comprised in the event message or updating may take place on the basis of a combination of parameters contained in the messages and retrieved in step S42A.

In case it is determined in step S6 that the message is of a second subtype a reference to an entry in a pattern header memory is retrieved S51 from the event message payload PL and from that reference entry an indication of one or more entries in a pattern memory 116 is obtained S52. Then the neuromorphic elements in the specified set are updated S53 in accordance with a pattern specified in the indicated one or more entries in the pattern memory 116.

An embodiment of the method may further comprise additionally obtaining S52A a specification FM-start, FM-size-X, FM-Size-Y of a feature map FM to be updated, and restricting the step of updating S53 to those neuromorphic elements in the specified set which are also inside the feature map.

Figure 11:
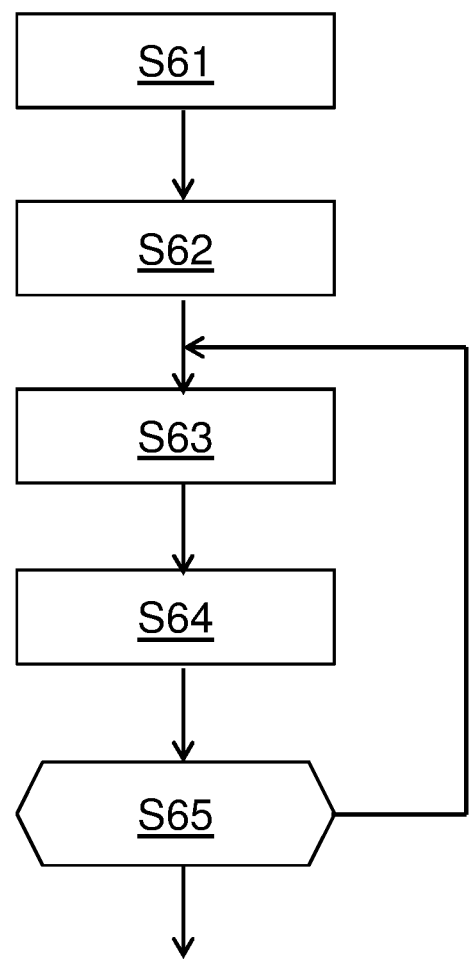
FIG. 11 shows a further alternative embodiment of a method of operating a neuromorphic processing system.

FIG. 11 schematically shows an alternative method of operating a neuromorphic processing system.

In step S61, a neuromorphic element (j) initiates an event procedure. This may for example be the case in that it provides a control signal Fj (See FIG. 2) to a message transmitting facility 120 (See also FIG. 8).

In step S62 a respective entry in a synapse header memory 122 is accessed (e.g. by controller 126 in FIG. 8) for said neuromorphic element and from that entry is retrieved a first destination address component ($C_{ID1,j}$, $N_{ID1,j}$) and a reference to a set of one or more entries (k) in a synapse property memory 124. Each of these referenced entries comprise a respective second destination address component ($C_{ID2,k}$, $N_{ID2,k}$).

In step S63 a respective destination address is computed (e.g. by controller 126 in FIG. 8) from the first destination address component ($C_{ID1,j}$, $N_{ID1,j}$) and in the respective second destination address component ($C_{ID2,k}$, $N_{ID2,k}$).

In step S64 a respective event message is transmitted (e.g. by controller 126 in FIG. 8) to a target neuromorphic processing element indicated by the respective destination address that was computed in step S63.

Steps S63 and S64 are then repeated for subsequent entries in the referenced set until it is determined in step S65 that a message was transmitted for each of said reference entries.

The invention claimed is:

1. A neuromorphic processing system comprising a plurality of neuromorphic processing clusters for exchange of event messages, each one of the event messages comprising a destination indication and an event message payload and further having an event message type indicating a direct event message type or a packed event message type, wherein a neuromorphic processing cluster of the plurality of neuromorphic processing clusters comprises:
    a neuromorphic processor having:
        a set of state memory entries, each state memory entry for storing a value representative of a neuromorphic state associated with a neuromorphic element, and
        a computation facility to update the neuromorphic state associated with each neuromorphic element of one or more neuromorphic elements indicated as a destination in the destination indication of a transmitted event message; and
    a message receiving facility to:
        retrieve, from a packed event message, a reference to a pattern header memory specifying a pattern,
        use the reference to retrieve from the pattern header memory an indication for a set of neuromorphic elements being a destination of the packed event message,
        compute a respective address of each of the neuromorphic elements in the set, and
        retrieve, from a direct event message, message parameters from the event message payload of the direct event message, the message parameters to be provided to a specific neuromorphic element indicated by the destination indication of the direct event message.

2. The neuromorphic processing system according to claim 1, wherein the message receiving facility to:
    retrieve one or more common update parameter values from a referenced entry in the pattern header memory, and
    instruct the computation facility to update the neuromorphic elements of the set of neuromorphic elements in accordance with the one or more common update parameter values.

3. The neuromorphic processing system according to claim 1, wherein the message receiving facility comprises the pattern header memory and a pattern memory, and
    wherein the message receiving facility is to:
    retrieve a reference to one or more entries in the pattern memory from a referenced entry of the pattern header memory, and
    instruct the computation facility to update the neuromorphic elements of the set of neuromorphic elements in accordance with parameter values specified in the referenced one or more entries in the pattern memory.

4. The neuromorphic processing system according to claim 1, wherein the message receiving facility comprises the pattern header memory and a pattern memory, and wherein the message receiving facility is to determine whether the packed event message is of a first subtype or of a second subtype, wherein the message receiving facility is to, upon determining that the packed event message is of the first subtype:
retrieve one or more common update parameter values from a referenced entry in the pattern header memory, and
instruct the computation facility to update the neuromorphic elements of the set of neuromorphic elements in accordance with the one or more common update parameter values; or
wherein the message receiving facility is to, upon determining that the packed event message is of the second subtype:
retrieve a reference to one or more entries in the pattern memory from the referenced entry of the pattern header memory, and
instruct the computation facility to update the neuromorphic elements of the set of neuromorphic elements in accordance with parameter values specified in the referenced one or more entries in the pattern memory.

5. The neuromorphic processing system according to claim 2, wherein the one or more common update parameters specify a leakage operation.

6. The neuromorphic processing system according to claim 3, wherein an entry in the pattern memory comprises a weight indication,
wherein the weight indication specifies a weight of an indicated element in the pattern to be applied when updating the neuromorphic element coinciding with the element in the pattern.

7. The neuromorphic processing system according to claim 3, wherein the indicated entry of the pattern header memory further comprises a specification of a feature map to be updated, and
wherein the computation facility is to update only the neuromorphic state of those neuromorphic elements in the specified set that are inside the feature map.

8. The neuromorphic processing system according to claim 3, wherein an entry in the pattern memory comprises an offset indication, and
wherein the offset indication specifies a location of a next element in the pattern.

9. The neuromorphic processing system according to claim 8, wherein the offset indication specifies that the indicated element is the last element of the pattern.

10. A method of operating a neuromorphic processing system with a plurality of neuromorphic processing clusters for exchange of event messages having an event message type indicating a direct event message type or a packed event message type, comprising:
receiving, by a neuromorphic processing cluster, a packed event message, the packed event message including:
a destination indication, and
an event message payload;
retrieving from the event message payload an indication of an entry in a pattern header memory;
obtaining from the indicated entry a specification for a set of neuromorphic elements as a destination of the packed event message;
updating the neuromorphic elements in the set;
receiving a direct event message;
selecting a neuromorphic element specified as the destination of the direct event message; and
updating a state of the neuromorphic element in accordance with message parameters contained in the event message payload of the direct event message.

11. The method according to claim 10, further comprising:
determining whether the packed event message provides a first pattern indication or a second pattern indication;
upon determining that the first pattern indication is provided, additionally obtaining update parameters from the indicated entry of the pattern header memory and updating all neuromorphic elements in the specified set in accordance with the update parameters; or
upon determining that the second pattern indication is provided, additionally obtaining an indication of one or more entries in a pattern memory from the indicated entry of the pattern header memory and updating the neuromorphic elements in the specified set in accordance with a pattern specified at the indicated one or more entries in the pattern memory.

12. The method according to claim 11, further comprising:
upon determining that the packed event message provides the second pattern indication, additionally:
obtaining a specification of a feature map to be updated; and
restricting the updating to neuromorphic elements in the specified set that are inside the feature map.

13. The method according to claim 10, further comprising:
initiating an event procedure;
retrieving, from a respective entry in a synapse header memory, a first destination address component and a reference to a set of one or more entries in a synapse property memory, wherein each of the referenced entries comprise a respective second destination address component; and
computing, for each of the referenced entries, a respective destination address from the first destination address component and the respective second destination address component and transmitting a respective event message to a target neuromorphic processing element indicated by the respective destination address.

14. The neuromorphic processing system according to claim 1, comprising a message transmitting facility that comprises a synapse header memory and a synapse property memory, wherein an entry in the synapse header memory includes a first destination address component and further comprises a reference to a set of one or more entries in the synapse property memory that each comprise a second destination address component, and wherein the message transmitting facility is to transmit a respective event message associated with each one of the one or more entries having a respective destination address computed from the first destination address component and the second destination address component.

15. The neuromorphic processing system according to claim 4, wherein the one or more common update parameters specify a leakage operation.

16. The neuromorphic processing system according to claim 4, wherein an entry in the pattern memory comprises a weight indication, wherein the weight indication specifies a weight of an indicated element in the pattern to be applied when updating the neuromorphic element coinciding with the element in the pattern.

17. The neuromorphic processing system according to claim 4, wherein the indicated entry of the pattern header memory further comprises a specification of a feature map to be updated, and wherein the computation facility is to update only the neuromorphic state of those neuromorphic elements in the specified set that are inside the feature map.

18. The method according to claim 15, further comprising:
- determining whether the packed event message provides a first pattern indication or a second pattern indication;
- upon determining that the first pattern indication is provided, additionally obtaining update parameters from the indicated entry of the pattern header memory and updating all neuromorphic elements in the specified set in accordance with the update parameters or
- upon determining that the second pattern indication is provided, additionally obtaining an indication of one or more entries in a pattern memory from the indicated entry of the pattern header memory and updating the neuromorphic elements in the specified set in accordance with a pattern specified at the indicated one or more entries in the pattern memory.

19. The method according to claim 10, further comprising:
- retrieving a reference to one or more entries in a pattern memory from a referenced entry of the pattern header memory; and
- updating the neuromorphic elements in the set of neuromorphic elements in accordance with parameter values specified in the referenced one or more entries in the pattern memory.

20. The method according to claim 19, wherein an entry in the pattern memory comprises an offset indication, and wherein the offset indication specifies a location of a next element in a pattern.

* * * * *